July 18, 1939. F. W. STORCK 2,166,272
SHEET FEEDING APPARATUS
Filed March 26, 1938 11 Sheets-Sheet 5
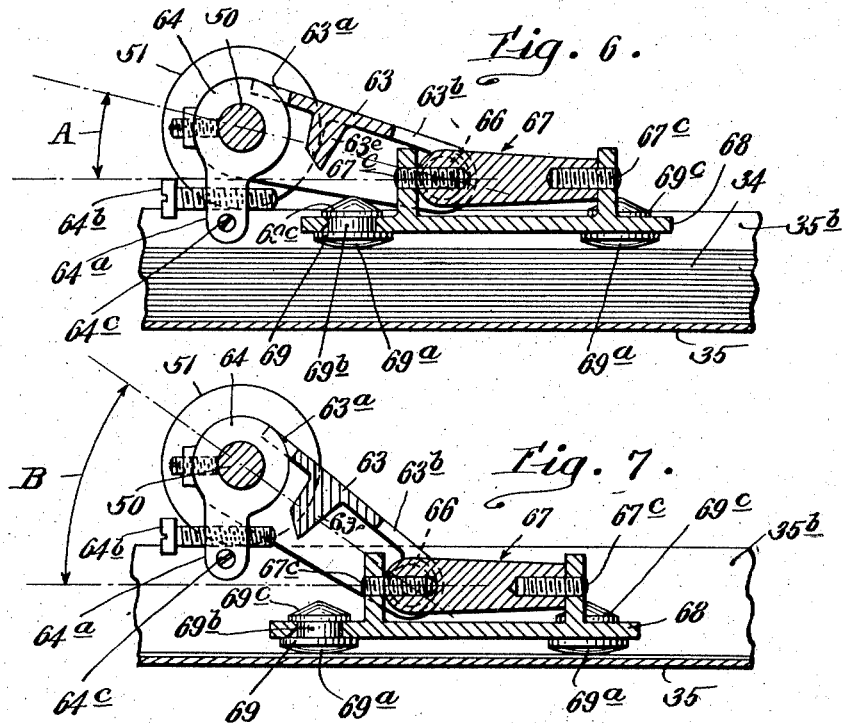
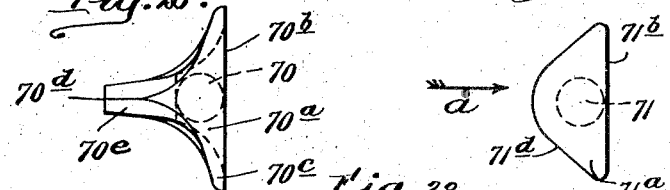
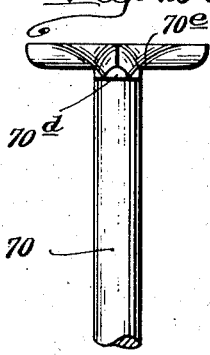
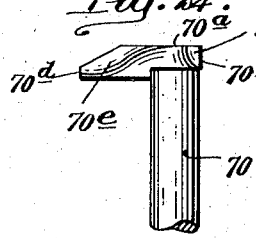
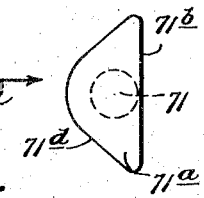
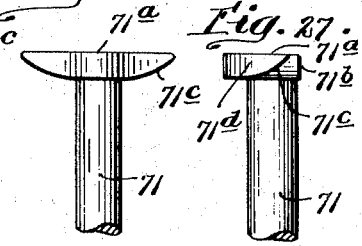
Inventor
FREDERICK W. STORCK
by Ernest R. Llewellyn
Atty.

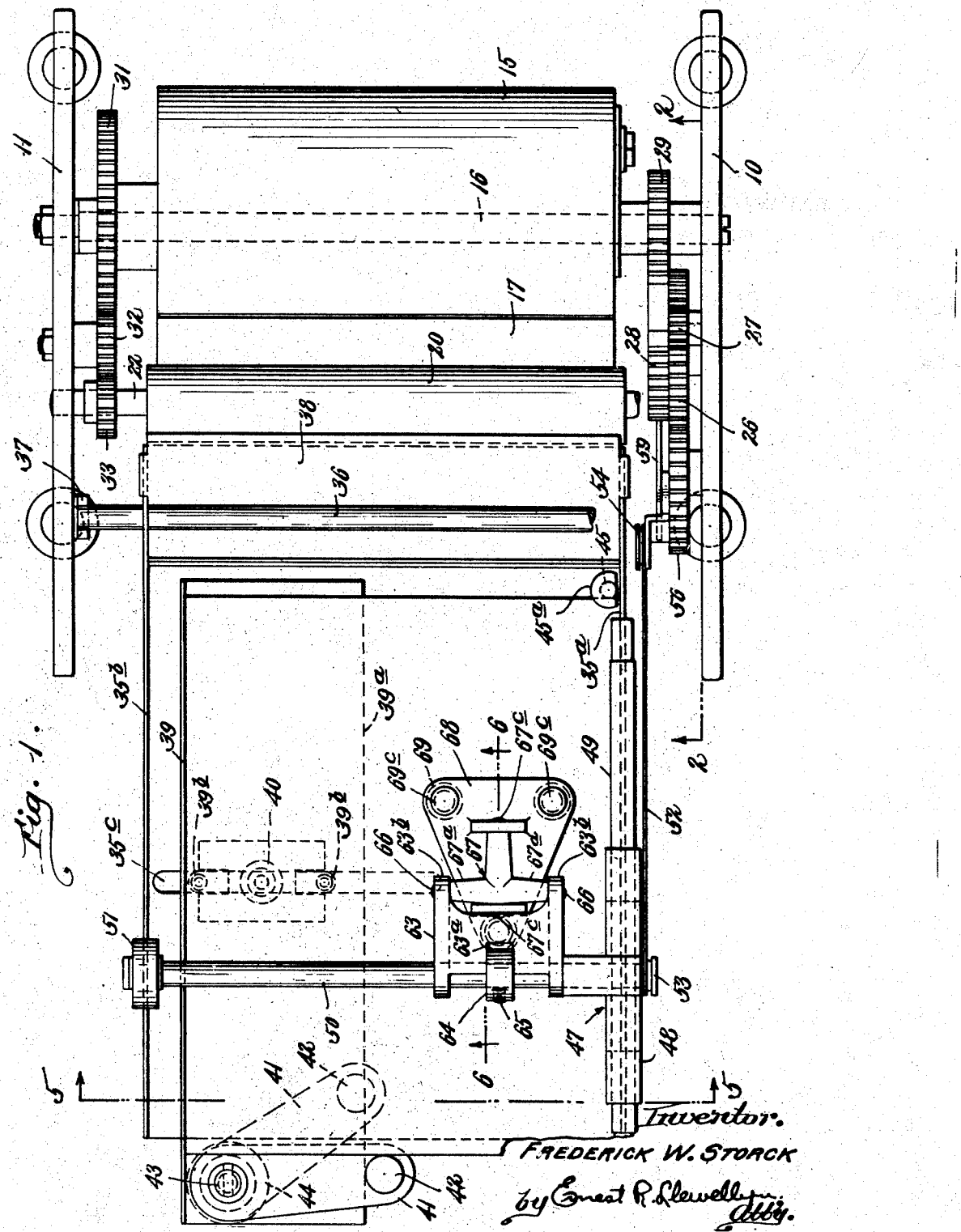

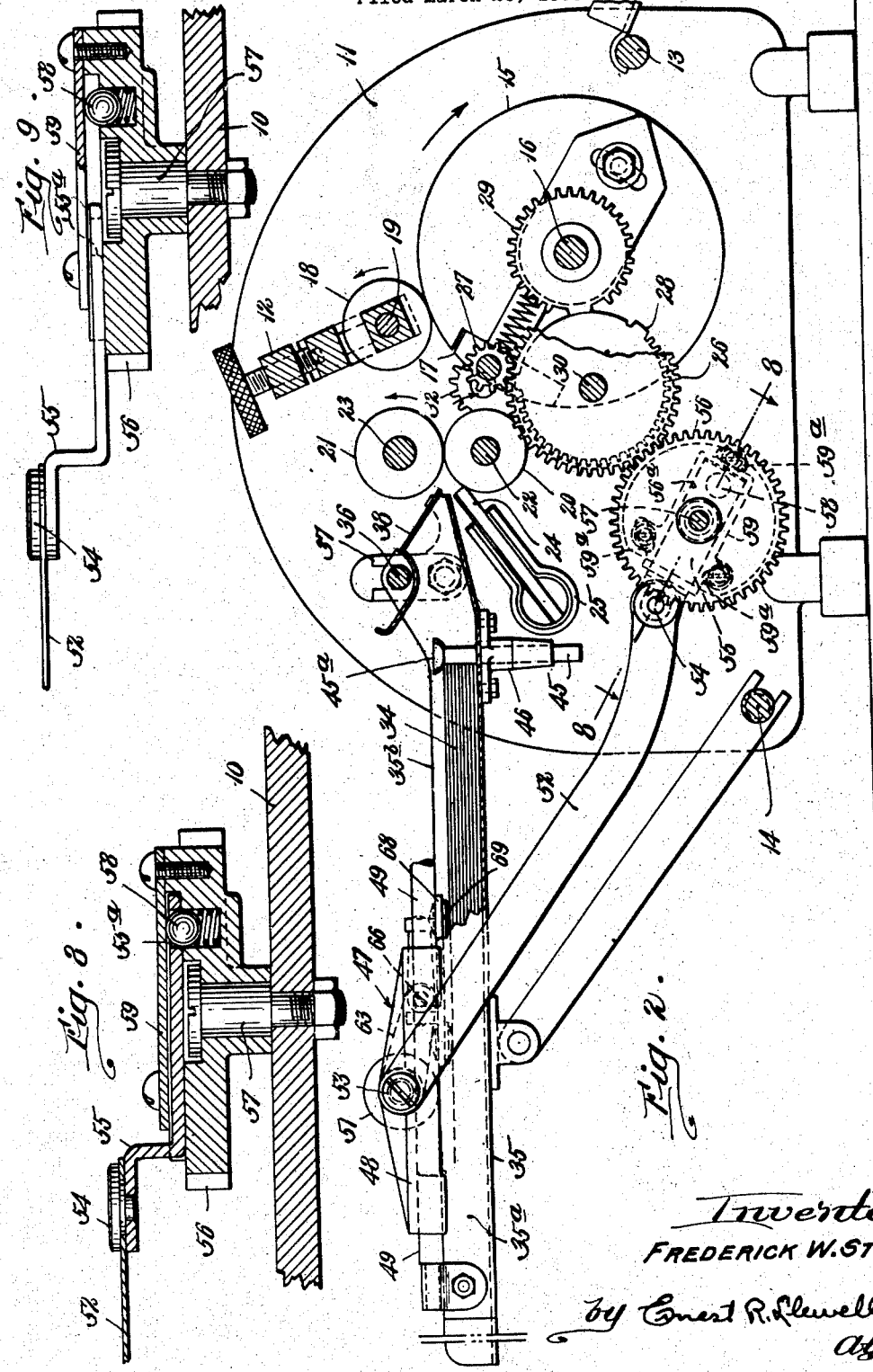

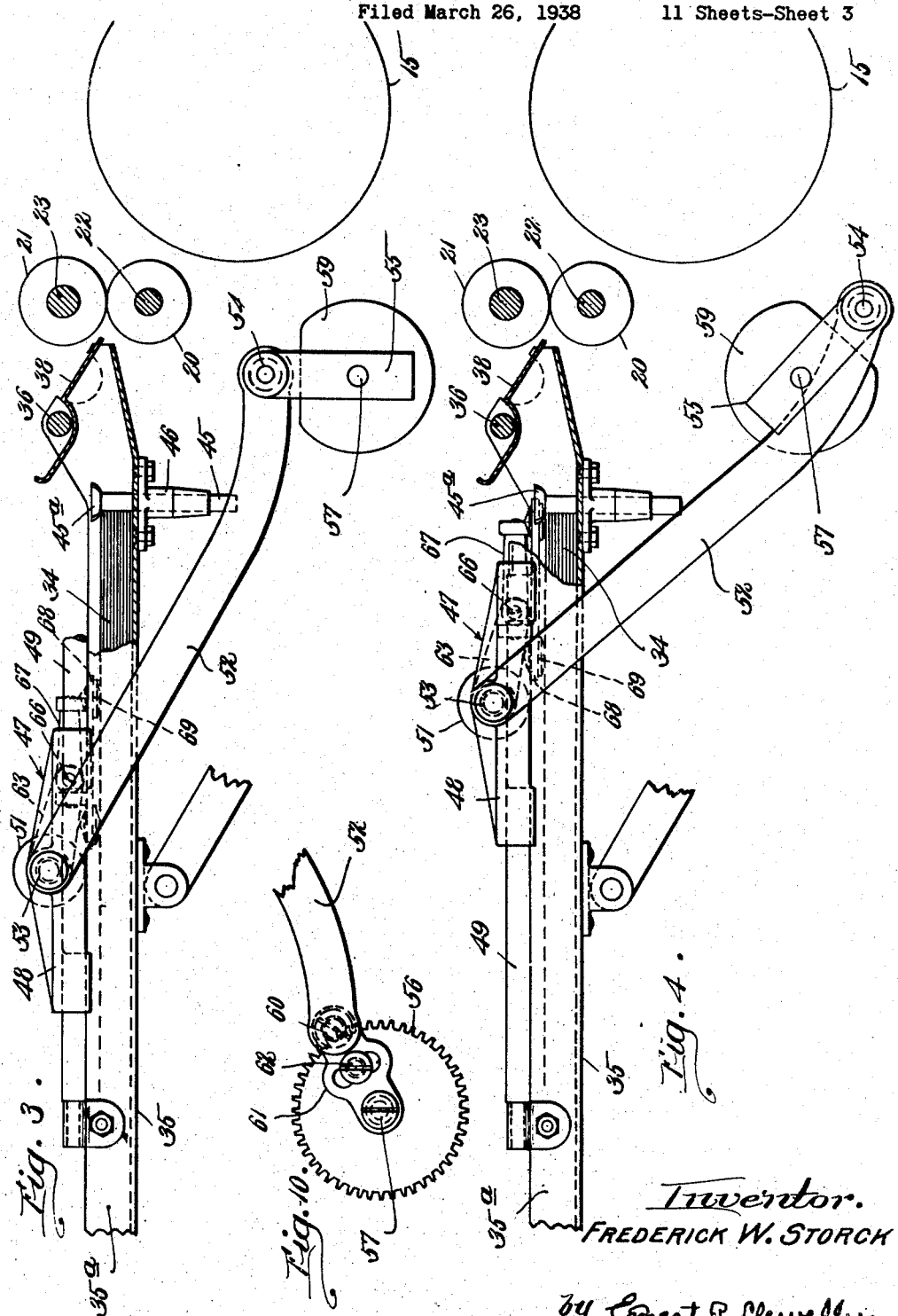

July 18, 1939. F. W. STORCK 2,166,272
SHEET FEEDING APPARATUS
Filed March 26, 1938 11 Sheets-Sheet 6
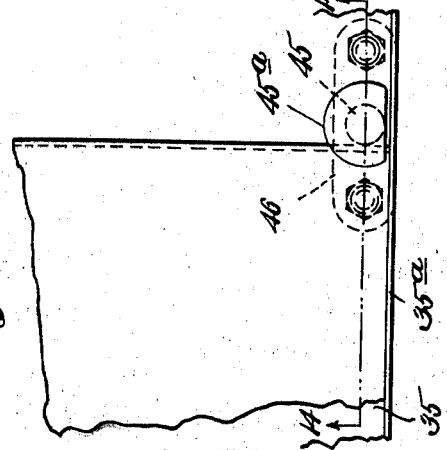
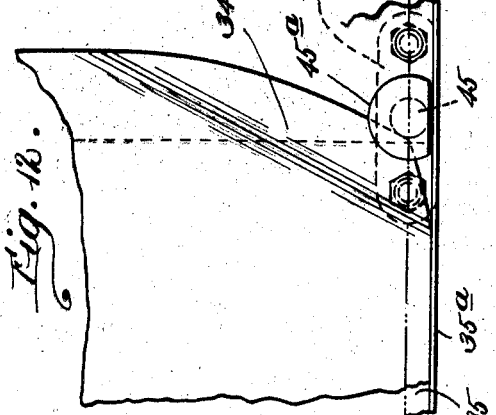
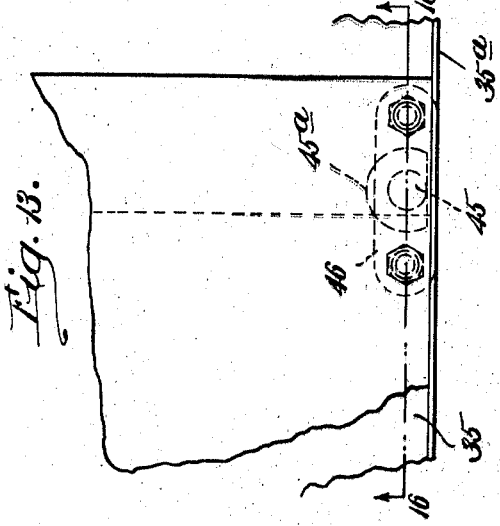
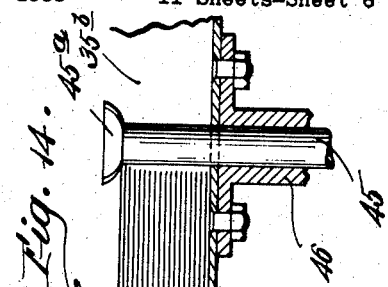
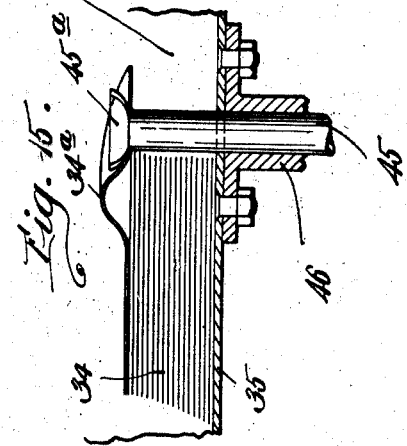
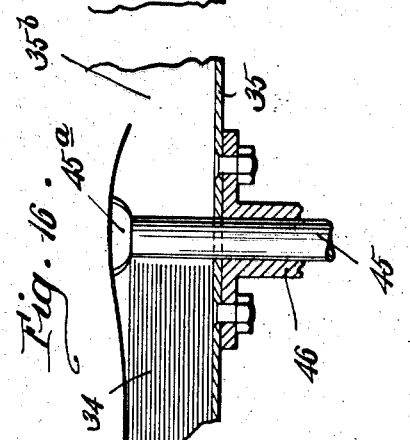
Inventor
FREDERICK W. STORCK
by Ernest R. Llewellyn Atty.

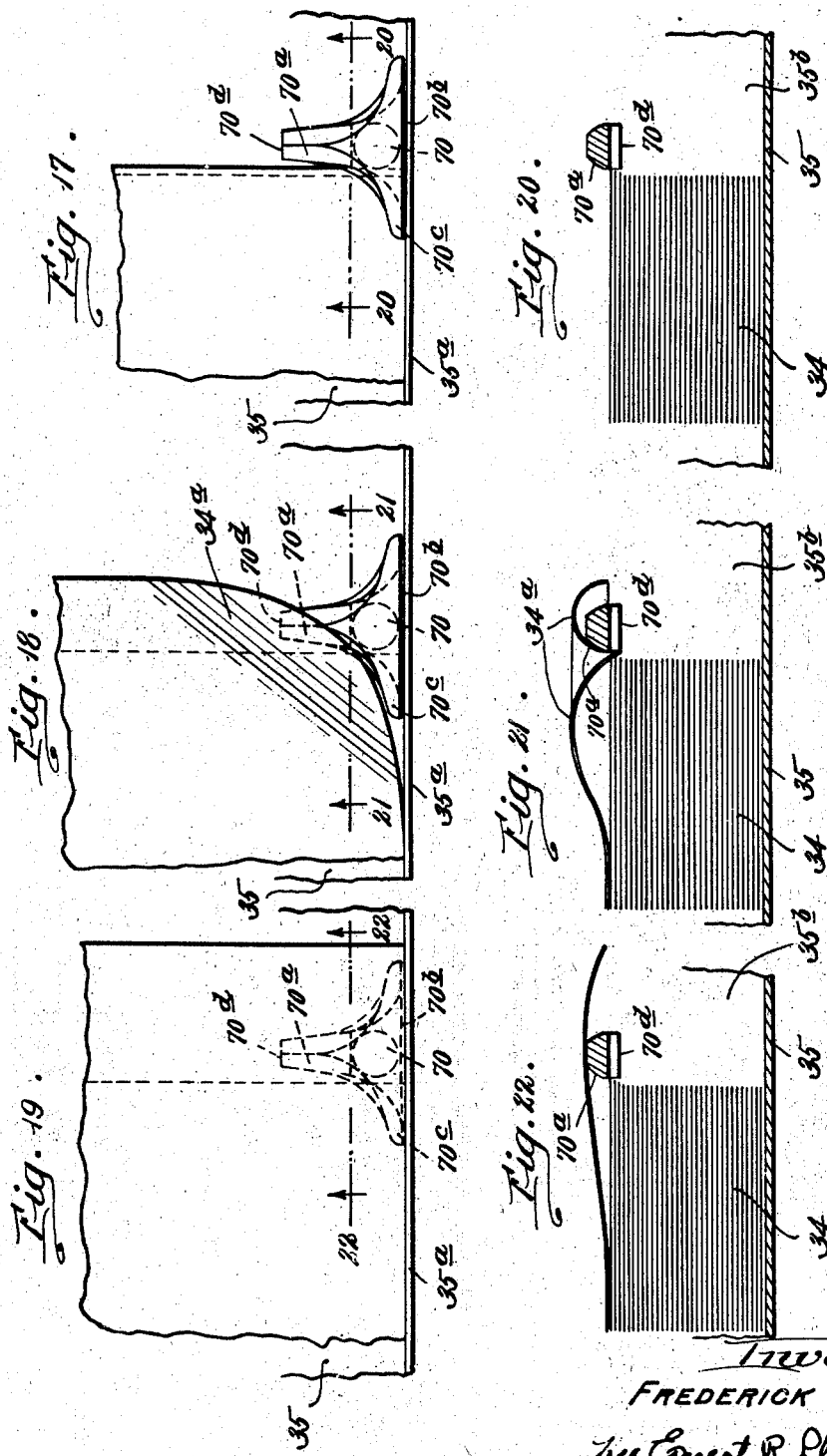

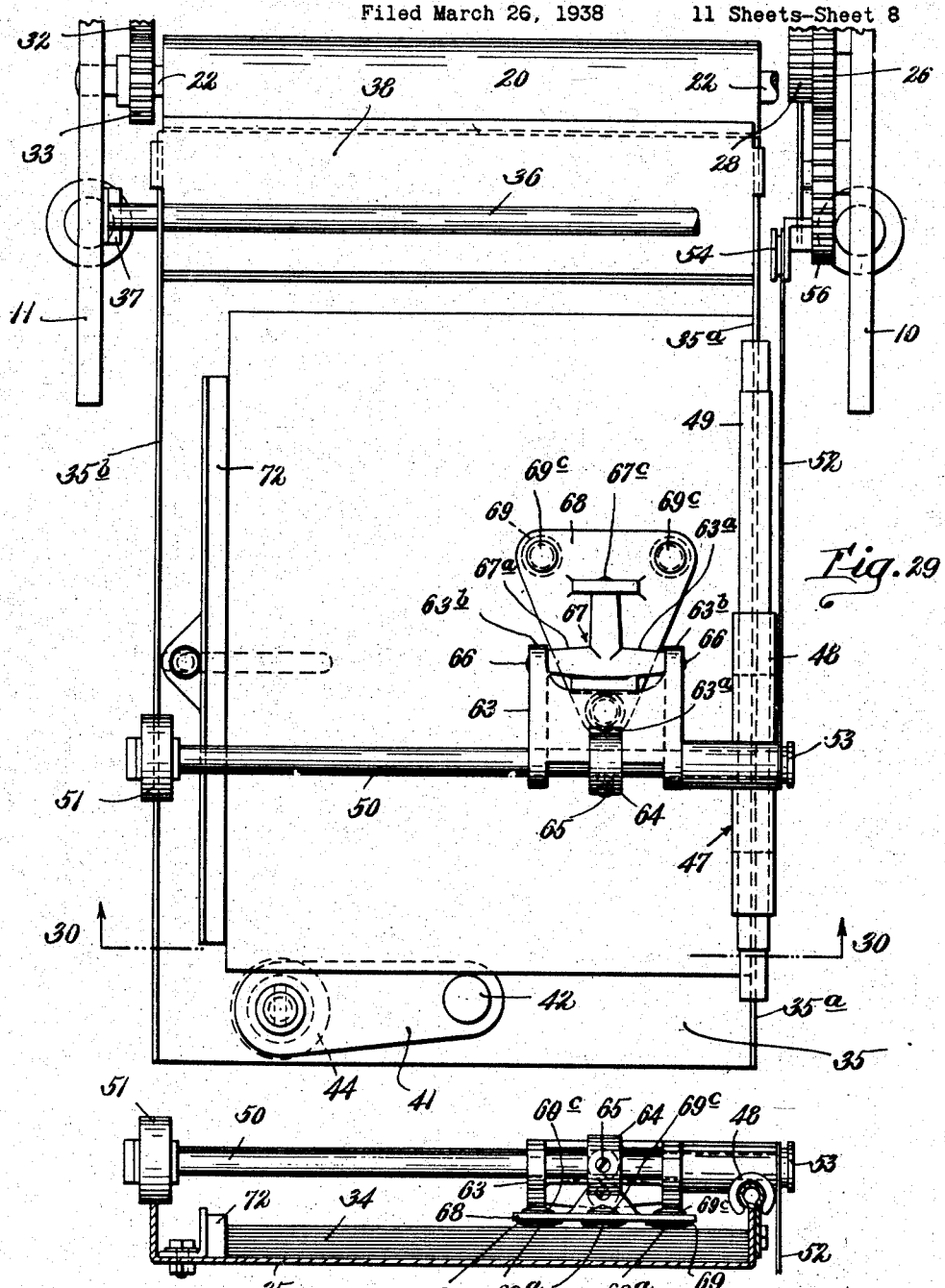

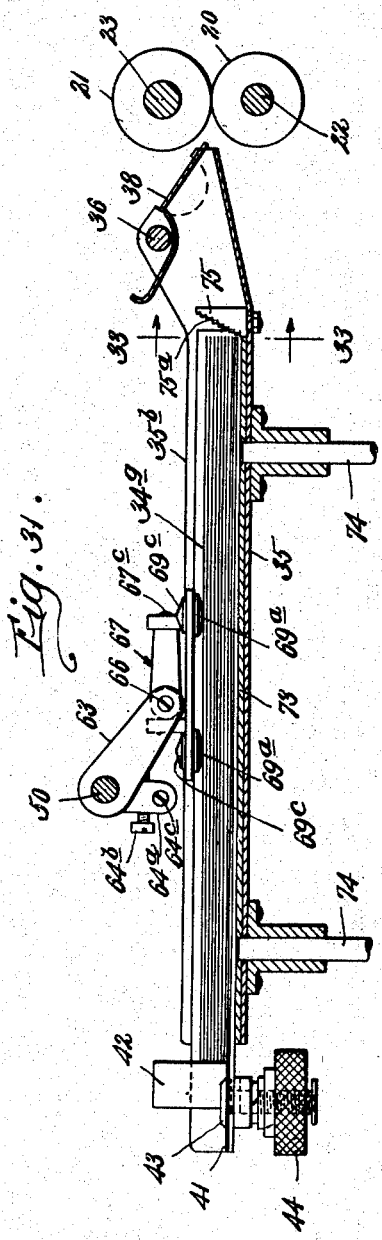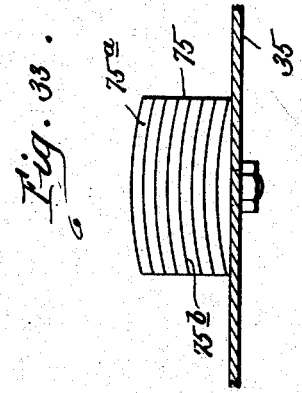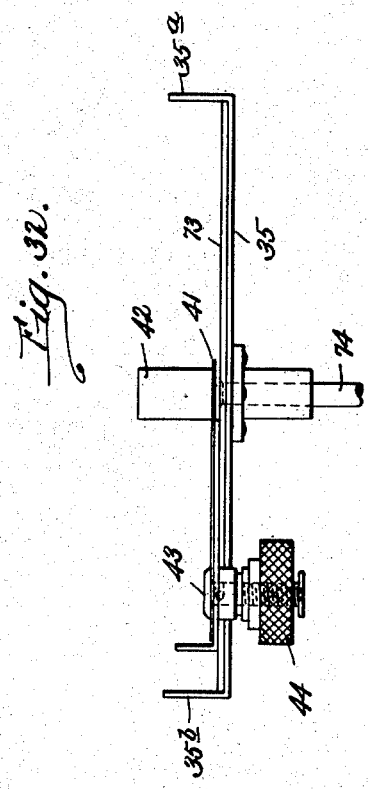

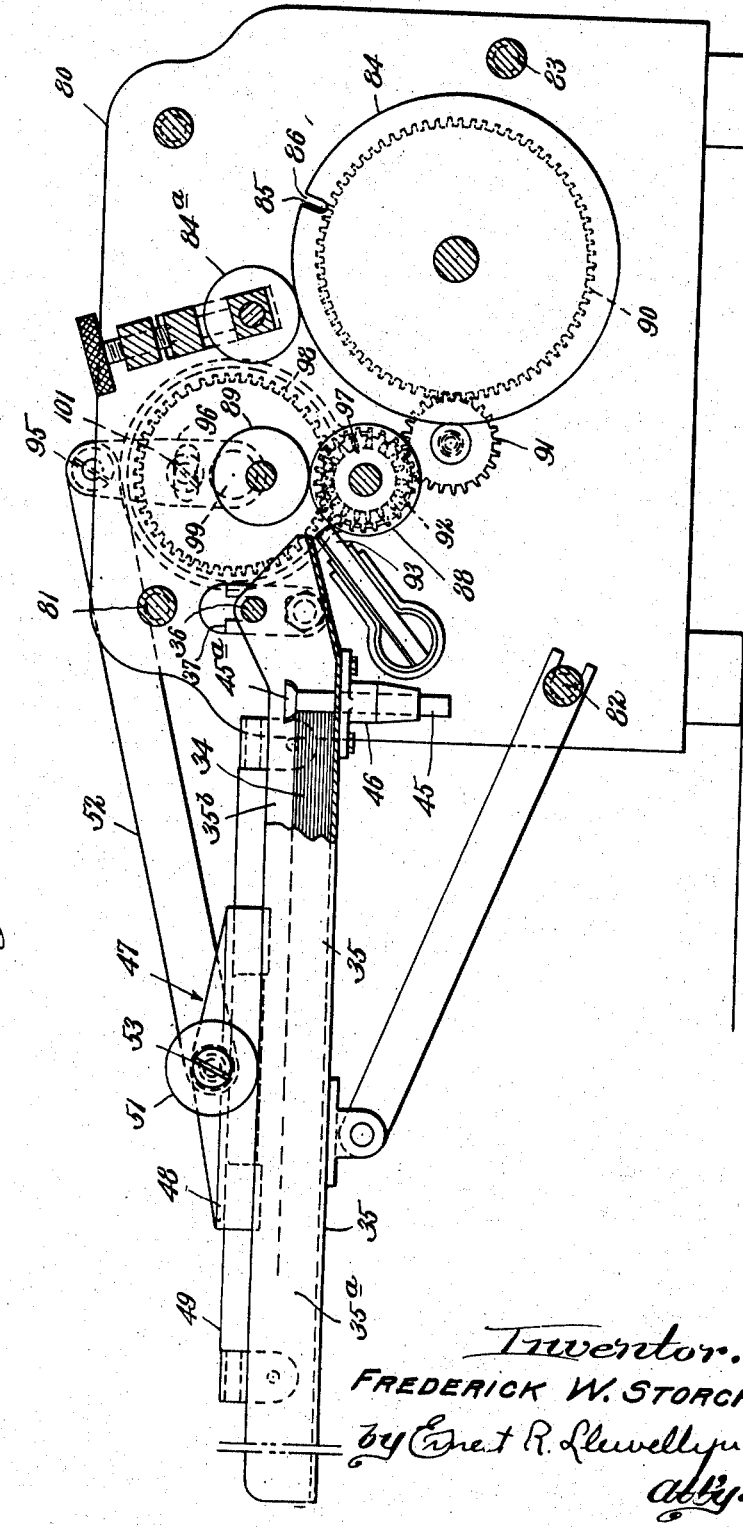

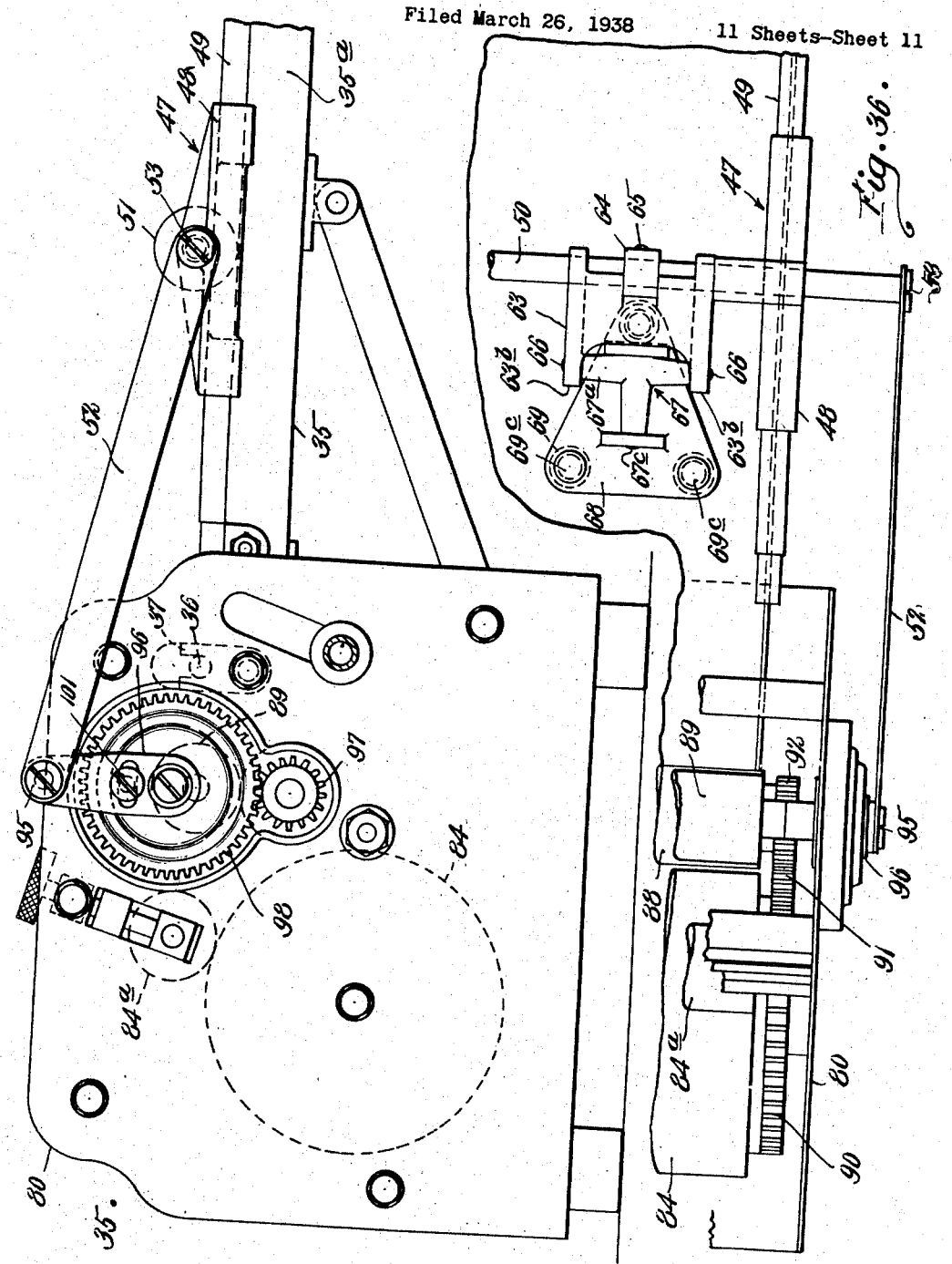

Patented July 18, 1939

2,166,272

UNITED STATES PATENT OFFICE 2,166,272

SHEET FEEDING APPARATUS

Frederick W. Storck, Arlington, Mass., assignor to Standard Mailing Machines Company, Everett, Mass., a corporation of Massachusetts Application March 26, 1938, Serial No. 198,283

41 Claims. (Cl. 271—43)

This invention relates to sheet feeding devices and more particularly to means for automatically advancing a single sheet or the like from a stack of sheets and in a manner that permits of the sheet being further advanced and operated upon by other mechanism and instrumentalities.

It is well known that the separating and advancing of a sheet singly from a stack of sheets presents many problems. Some of these problems may be stated as being directly and indirectly occasioned by varying characters inherent in the sheets themselves such as, for example, thickness and surface finishes. Also, the conveniently termed "static condition" that is occasioned or developed between sheets in a stack formation impedes the simple and convenient separation of a sheet singly from a stack, and this static condition may be further aggravated relative to the degree of pressure applied to the stack and may, therefore, cause two or more sheets to be advanced from the stack formation, when only a single sheet is desired.

I am aware that many mechanisms have been devised in an attempt to overcome the problems involved in providing a satisfactory and efficient device for separating and singly advancing a sheet from a stack. Many such devices, now used in the art, employ suction elements adapted to be engaged with the face of the outermost sheet of the stack and, through means of suction, singly separate this sheet for advancement and operative engagement with other mechanisms. Devices of this specific character require additional mechanism to produce and control the required suction or vacuum. Air is generally used and actuated to produce the required suction or vacuum function which must be positively operated in a timed relation.

Mechanical structures have also been devised for this purpose of separating an outermost sheet from a stack and advancing the sheet in a manner so that it may be subsequently operated upon. Generally stated, the present known mechanical sheet feeding and separating devices require a complicated structure embodying various adjustments to permit of its use in connection with the range of conditions and problems presented. These mechanical devices are usually provided with a friction element that is carried by a carriage reciprocated along the face of the sheet stack, or the friction element may be rotated in contact with the outermost sheet of the stack. The present friction devices of which I am aware are of sufficient weight in themselves to cause the friction element to engage with the face of the stack with more than sufficient pressure to operatively engage and advance the single sheet with which it is engaged, and thus requiring that other means, such as, for example, rubber friction pads, be employed to retard movement of the remainder of the stack, and still further means to assure of the frictionally engaged sheet being singly advanced from the stack. A rubber material is generally employed as the direct friction element and it is well known that, to be efficient for this function, the rubber must be periodically renewed or replaced. In the instance where rubber rollers are utilized, replacement usually requires a disassembling and assembling of a portion of the mechanism, and is expensive.

It is generally conceded that an automatic sheet feeding device is a desirable feature and facilitates in the operation and performing of the functions of many machines. Desirable feeding devices of this character should be of a most simple and efficient construction and without a requirement for minute or complicated adjustments as, in a great many instances, the machines are operated by mechanically inexperienced persons, or persons who are not adept at making varied and fine adjustments of the mechanism.

Automatic sheet feeding devices are usually built into and form a permanent part of the machine structure, while it may be desirable at times to feed a sheet singly by hand to obtain certain desired results or objects, such as operating for a proof sheet, extremely short runs or similar instances. These conditions, together with the need for positioning the stack of sheets conveniently and properly upon its support, makes it desirable that the feeding device is so constructed and arranged as to be readily removed or disposed in an inoperative or non-interfering position.

Therefore, one of the primary objects of the present invention is to provide a novel method and apparatus for feeding sheets singly from a stack of sheets.

Another particular object of the invention is to provide an automatic sheet feeding device of a simple and efficient construction with few working parts that will not require a number of manual adjustments and that may be easily and readily removed and attached to the machine or readily displaced in an inoperative position.

Another object of the invention is to provide a sheet feeding device that will automatically adjust itself to the various heights of the stack without a requirement for mechanically actuated adjustments, or that may be readily used in connection with such adjustments.

A further object of the invention is to provide a sheet feeding device of a simple structure that will effectively separate and advance a sheet singly from a stack of sheets and in a manner so that the sheet will be advanced to register for engagement with subsequent operating elements of the machine.

The foregoing objects are intended as a general explanation and are not to be construed as a limitation as further objects and advantages will be obvious from the appended detailed description of a preferred construction and modifications of the sheet feeding device illustrated in the drawings and forming a part hereof.

To accomplish the above and associated objects, I have found that by constructing a friction device of a form as is consistent with utility and providing pivotal connections between a reciprocal carriage and the frictional contact with the outermost of a stack of sheets, the pivotal connections may be arranged to form what may be conveniently termed a "knee action". When associated with a friction element in engagement with the outermost sheet of a stack of sheets, this knee action may be disposed to exert a sufficient degree of pressure upon the frictional contact to operatively advance the engaging sheet from the stack when the reciprocal carriage is moved in one direction, but will be ineffective to exert pressure when the carriage is moved in its opposite direction, and the weight of the device resting on the outermost of the stack will, in itself, be insufficient to materially displace a sheet from the aligning guides or abutments for the stack. With the herein novel construction, a method of feeding sheets singly from a stack of sheets may be employed wherein the sheet is moved rearwardly to engage with a determinate positioned abutment stop and advanced from its positioned engagement with the abutment stop so as to register and engage with other instrumentalities of the machine.

I have also found that with a friction feeding device constructed and arranged in accordance with the herein present form, and some modifications thereof illustrated, the usual problems in applying and adjusting friction and like devices, to prevent displacement of the stack, may be substantially dispensed with when my novel abutment stop is provided for the forward end of the stack. Also, in a modified embodiment which I have illustrated, the stack of sheets may be arranged with a degree of friction engaging with the stack and without an abutment stop for the forward end of the stack, and my present friction feeding device may be utilized to advance its engaging sheet singly from the stack when the feeding device is moved in one of its directions, but the device will be ineffective to materially displace its engaging sheet when moved in its opposite direction.

In the accompanying drawings, I have shown a practical embodiment of the invention associated with a wet process duplicating machine, sufficient to enable those skilled in the art to understand the construction and operation thereof. While I have preferred to show my present invention associated with a machine of a particular type, it is to be understood that this is for illustrative purposes only and the invention is not to be construed as limited thereto. The invention comprises a structure and elements forming a novel combination and arrangement of parts as will be hereinafter described and more specifically pointed out in the appended claims.

Referring to the drawings:

Fig. 1 is a plan view of a wet process duplicating machine having my improved automatic sheet feeding device embodied therewith.

Fig. 2 is a side elevation of the machine and sheet feeding device with one of the side frames of the machine omitted and a portion of the sheet stack support broken away.

Fig. 3 is a side elevation of the sheet feeding device and stack support substantially as shown in Fig. 2, but shows the feeding device in a different position and portions of the machine diagrammatically illustrated.

Fig. 4 is a view corresponding to Fig. 3 but shows the sheet feeding device in still another position.

Fig. 6 is an enlarged sectional elevation of a portion of the sheet feeding device taken substantially along line 6—6, Fig. 1.

Fig. 7 is a view corresponding to Fig. 6 but shows some of the parts in a different position.

Fig. 8 is a sectional detail of a preferred form of the quickly detachable crank action connection for the feed carriage reciprocating drive taken substantially along line 8—8, Fig. 2.

Fig. 9 is a view corresponding to Fig. 8, but shows the connection partially detached.

Fig. 10 is a modified form of a crank action connection for the feed carriage reciprocating drive.

Fig. 11 is a plan view of a forward corner portion of the stack of sheets and showing the uppermost sheet of the stack in engagement with the front abutment stop preparatory to being advanced from the stack.

Fig. 12 is a view corresponding to Fig. 11, but shows the uppermost sheet further advanced from the stack.

Fig. 13 is a view corresponding to Fig. 12, although in this view the uppermost sheet has been further advanced from the stack and disengaged from the front abutment stop.

Fig. 14 is a sectional elevation taken substantially along line 14—14, Fig. 11.

Fig. 15 is a sectional elevation taken along line 15—15, Fig. 12.

Fig. 16 is a sectional elevation as would be viewed along line 16—16, Fig. 13.

Fig. 17 is a plan view of a forward corner portion of the stack of sheets and showing the uppermost sheet of the stack in engagement with a modified form of the front abutment stop.

Fig. 18 is a view corresponding to Fig. 17 and illustrates the position of the forward end corner of the sheet when further advanced from the stack.

Fig. 19 is a view corresponding to Fig. 18, but with the uppermost sheet advanced beyond its engaging point with the front abutment stop.

Fig. 20 is a sectional elevation corresponding to line 20—20, Fig. 17.

Fig. 21 is a sectional elevation viewing along line 21—21, Fig. 18.

Fig. 22 is a sectional elevation viewed along line 22—22, Fig. 19.

Fig. 23 is a plan view of the modified form of front abutment stop illustrated in Figs. 17 to 19 inclusive.

Fig. 24 is a side elevation of the modification illustrated at Fig. 23.

Fig. 25 is a front elevation of the abutment stop shown at Figs. 23 and 24.

Fig. 26 illustrates a further modified form for a front abutment stop.

Fig. 27 is a side elevation of the modified form shown at Fig. 26.

Fig. 28 represents a front face view of the abutment stop illustrated in Figs. 26, 27, and viewing in the direction of arrow A, Fig. 26.

Fig. 29 is a plan view of a portion of the duplicating machine illustrated at Fig. 1, but in this present view a modified form of my sheet feeding device is associated with the machine.

Fig. 30 is a sectional elevation taken substantially along line 30—30, Fig. 29.

Fig. 31 is a longitudinal sectional view showing another modified adaptation of my present sheet feeding device.

Fig. 32 is an end view of the modified adaptation illustrated at Fig. 31.

Fig. 33 is a fragmentary section taken substantially along line 33—33, Fig. 31.

Fig. 34 is a transverse section of a wet process duplicating machine that embodies feeding and operating instrumentalities that are adapted to be continuously rotated and shows the present primary sheet feeding device associated therewith.

Fig. 35 is one side elevation of the machine illustrated at Fig. 34 and shows the operating means for the primary sheet feeding device carriage, and Fig. 36 is a partial plan view showing the drive for the feeding carriage of the machine illustrated at Figs. 34 and 35.

The illustrated duplicating machine

Figure 5:
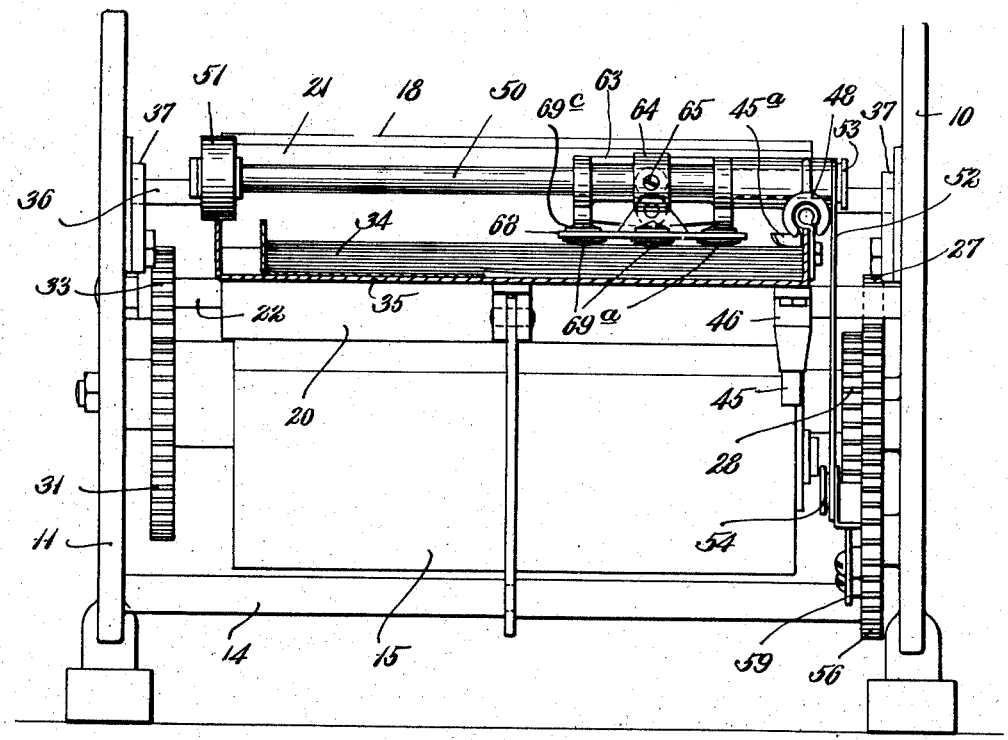
Fig. 5 is a transverse section taken substantially along line 5—5, Fig. 1, with some of the elements of the machine viewed beyond the section line omitted.

While, obviously, there are many types of machines to which the present invention may be adapted, I have found it convenient to describe it in association with a well known wet process duplicating machine. This machine is provided with opposed side frames 10, 11 that are retained in a spaced-apart relation, as by means of suitable tie rods 12, 13, 14 or like members.

The printing platen or drum 15 is rotatably mounted upon a shaft 16 that, in turn, is secured against rotation in suitable bearings in the opposed side frames. The printing drum 15 is provided with a suitable clamping device 17 for the purpose of securing a master copy to the drum.

A coacting pressure roller 18 engages with the peripheral face of the drum 15 and is mounted upon a shaft 19 journalled at its ends in suitable bearings in the side frames.

In this particular machine, a pair of feed rollers 20, 21 is disposed in front of the bight formed by the printing drum 15 and its coacting pressure roller 18. Each feed roller 20, 21 is provided with a shaft 22, 23 that is rotatably supported in suitable bearings. In this instance, the lower feed roller 20 is utilized as an intermediate moisture applicator and is supplied with moisture by a wick 24 having one edge in engagement with the peripheral face of the applicator 20 and its lower body portion in engagement with fluid contained in a suitable receptacle 25.

The machine drive

To effect the desired intermittent rotation of the printing drum 15, the driving elements of the machine include a primary gear 26 that is adapted to be continuously rotated as, for example, by means of a pinion 27 associated with a suitable source of power or hand crank (not shown). An intermittent gear 28 is secured to the primary gear 26 and meshes with a coacting intermittent gear 29 that is operatively associated with the drum or platen 15. The gears 26 and 28 are rotatably mounted on a stud 30 that is secured to one of the side frames. The intermittent gears 28, 29 are of the usual construction wherein a predetermined portion of the periphery of each is free from teeth and continued rotation of the driving gear will not rotate the driven gear until the blank space in the driving gear has passed the blank space in the driven gear and the teeth in both enmesh.

The feed rollers 20, 21 are intermittently rotated with the printing drum 15 by means of a gear 31 which is secured to one end of the drum and rotated therewith. This gear 31 meshes with and drives an intermediate gear 32 that, in turn, enmeshes with and drives a pinion 33 adapted to rotate one of the feed rollers 20, the coacting feed roller 21 being frictionally rotated by the driven roller 20.

A duplicating machine of the above general character is fully shown and described in my Reissue Patent No. 19,951, therefore, further detailed description is thought to be unnecessary. The foregoing detailed description is sufficient to illustrate the adaptation of the present invention to machines of this general or a like character to which sheets are fed singly from a stack to be subsequently operated upon by elements of the machine.

The sheet stack support

The stack of sheets 34 to be operated upon is supported upon a tray 35 which, in the present instance, is provided with upwardly extending flanges 35a, 35b. The forward end portions of the flanges 35a, 35b are secured to a transverse rod 36 which extends beyond the flanges and engages in slotted bearings 37, secured to the opposed side frames, so as to support the forward end of the tray in a positioned relation to the bight formed by the feed rollers 20, 21. The forward end of the tray 35 is provided with a deflecting plate 38 so disposed that the sheets advanced thereagainst will be properly guided to the feeding rollers 20, 21.

Adjustably supported by the tray 35 is a guide 39 that is substantially L-shape in cross-section and forming a base portion 39a. This base 39a is provided with depending projections 39b that engage in a suitable slot 35c, formed in the tray 35, so as to substantially retain the guide in proper alignment during transverse adjustment for the various widths of stacks. The guide 39 is secured in its proper adjusted relation relative to the edge of the stack by means of a suitable locking screw and nut 40 that clamps the guide base 39a to the tray 35.

Pivotally attached to the rearward extending portion of the guide base 39a is an arm 41 that is provided with a vertically extending abutment stop 42 adapted to be engaged with the rear end of the stack 34. The pivot stud 43, for the arm 41, is formed in a manner and provided with a clamping nut 44 so as to permit adjustment of the abutment stop 42 for the various lengths of stacks and to secure the stop 42 in its adjusted position.

This abutment stop 42 may be utilized to function as a determinate positioning stop with which the uppermost sheet of the stack is engaged before being advanced in its feeding direction in modifications and adaptations of the present invention, as will later be more fully described.

The forward abutment stop

An abutment stop is provided for sheets being advanced from the stack and an efficient form, Figs. 1, 2 and 11 to 16 inclusive, comprises a shank 45, vertically disposed and freely slidable in a bearing 46 secured to the tray 35. This shank 45 is provided with an enlarged head 45a or projection adapted to engage with the uppermost of the stack with a minimum degree of pressure and in this manner, the weight of the stop is only required to be sufficient to cause the stop to automatically adjust itself as the height of the stack is diminished. Preferably, the stop is of a lightweight construction so that the head 45a or extension will not bear on the stack with a degree of pressure that would materially pinch the forward end of the stack in a manner that would prevent the sheet from readily and freely disengaging itself. Also, the stack end is slightly spaced apart from the shank 45 so as not to interfere with its free sliding movement in its bearing 46 under its own weight as the stack height is reduced by sheets being fed therefrom. The underneath portion of the abutment stop head 45a is preferably relieved or rounded in a manner to further reduce its contact with the stack and also to permit freedom of movement in the starting of a buckle in that portion of the advancing end of the sheet which contacts with the abutment stop shank 45.

The sheet feeding device

Disposed above the stack 34 is a reciprocal carriage generally indicated at 47 and comprising a bearing 48 slidably mounted on a suitable support 49 associated with the tray 35. This bearing 48 supports one end of a transverse rod 50. In the present structure, the transverse rod 50 is provided with a rotatable bearing member 51 adapted to engage with one of the tray flanges 35b. It is obvious that there are many ways and means for supporting the carriage so that it may be reciprocated in relation to the face plane of the stack. In the present instance, the bearing 48 and its support 49 are so designed that the complete carriage may be readily removed from the support by disengaging its reciprocating link 52, as will be later explained, and sliding the complete carriage and bearing rearwardly from the bearing support 49.

Feed carriage drive

Means for reciprocating the carriage 47 includes a link 52 having one end thereof pivotally connected at 53 to the carriage. The opposed end of this link 52 is pivotally connected at 54 to a slide member 55 adapted to engage in a chamber 56a formed with the carriage drive gear 56 rotatably supported on a stud 57 that is secured in one of the side frames. This carriage drive gear 56 enmeshes with and is continuously rotated by the machine gear 26 so that the carriage is reciprocated in a timed relation to the operation of the machine.

The slide member 55 is provided with an opening 55a adapted to be engaged by a spring-pressed lock ball 58 disposed in the gear 56 and engages in the chamber 56a. The flanged member 59 is secured to the carriage drive gear 56 in a manner to form the chamber 56a for the slide 55. This member 59 is provided with slots 59a so that the member may be moved on the face of the gear 56 so as to circumferentially adjust the pivot point 54 of the link 52 so as to affect the timing of the movement of the carriage and thus provide an adjusting increment of less than a whole tooth of the gear 56. When this slide 55 is locked, by the ball 58, in its operative position in its chamber 56a and in association with the drive gear 56, its pivotal connection 54 with the carriage 56 will be rotated in the form of a crank link 52 motion and thus reciprocate the carriage 47. The spring-pressed lock ball 58, or a like member, permits the slide 55 to be readily assembled and disassembled, Fig. 9, from its operative engagement with the carriage driving gear 56 when the automatic sheet feed is not desired or as occasion may require.

While the foregoing description illustrates a preferred form of crank motion connection, the carriage may be reciprocated by various well known means. Such a modified form is shown at Fig. 10, and wherein the carriage link 52 is shown pivoted at 60 to a member 61 rotatively supported on the gear stud 57 and adjustably secured to the face of the gear 56 by means of a lock screw 62.

Frictional sheet contact

Freely supported on the carriage transverse rod 50 is a bracket 63 having a cut-out 63a adapted to receive a member 64 also freely mounted on the rod 50 and provided with a lock screw 65 by which the member 64 may be secured in a desired position along the rod 50. The member 64 is provided with a depending portion 64a having a threaded bore adapted to receive an adjusting screw 64b. In the present instance, the depending portion 64a is provided with a transverse slot that extends through the bore of the screw 64b and by means of a lock screw 64c, the screw 64b may be locked in an adjusted position. The inner end of the screw 64b will engage with a projection 63e of the bracket 63 as the stack is diminished to a point where further increase in the angularity of the bracket would begin to have an undesirable locking action and exert too great a pressure. The bracket 63 is provided with opposed arms 63b having the opposite ends of a cross rod 66 secured therein. Freely mounted upon this cross rod 66 is a bearing 67a of a spider that is generally indicated at 67. The spider is provided with pivots 67c disposed at right angles to the bearing 67a and which pivotally engage with a shoe 68. The freely mounted bearing 67a of the spider and the pivots 67c of the shoe 68 permit self-aligning of the shoe 68 in opposed directions relative to a horizontal plane as the bracket 63 is moved along or about its supporting rod 50.

The under face of the shoe 68 is provided with projecting friction members, generally indicated at 69, that are formed with an enlarged buttonhead 69a, see Figs. 6 and 7, having a rounded or like face that preferably is adapted to make a point contact with the upper most of the stack and in a manner whereby the pivotal connections permit the shoe 68 to self-align itself with the face of the stack. The present friction members are conveniently formed of a suitable rubber and comprise a shank portion 69b, adapted to engage in suitable openings in the shoe 68, and an opposed head portion 69c that, for convenience, is provided with an inverted cone-shaped outer face. The outer faces of the heads 69c permit the members 69 to be readily inserted in the shoe openings and the innermost faces of the opposed heads 69a, 69c retain these friction members in their assembled relation with the shoe.

With friction member inserts 69 so constructed, these inserts may be conveniently removed and replaced as occasion requires by merely pressing the insert members into or out of the openings in the shoe 68.

From noting the present frictional device, it may be readily perceived that modifications may be made therein that would be adapted to function in the herein intended manner. It is to be further noted that the frictional sheet contact device should be of as light construction as is consistent with practical manufacturing and utility and so as to bear with a minimum degree of pressure when the device is in operative position and such that when the device is moved as, for example, in its rearward or non-feeding direction, the pressure from the weight of the device itself, which may be conveniently termed gravity friction, will not materially displace or buckle the sheet, with which it is in contact, against an abutment or obstruction such as may be used for positioning the rear end of the stack.

*Operation*

The stack of sheets 34 is placed on the support 35 with one side edge of the stack abutting against the side flange 35a of the support and the forward end of the stack spaced slightly to the rear of the shank 45 of the front abutment stop with the head 45a of the stop resting on the face of the stack. The guide flange 39 is positioned relative to the opposed side edge of the stack 34 and the rear abutment stop 42 adjusted to engage with the rear end of the stack. The friction shoe 68, which may be conveniently displaced from its operative position while the stack is being properly arranged, is then positioned in engagement with the face of the stack.

The drum 15 is intermittently rotated through its gearing as previously described. The gear 56, enmeshing with the gear 26 and crank connections, will cause the carriage 47 to be moved backward and forward on its guides and along the face plane of the stack in a timed relation to the rotation of the drum 15 and, in the present instance, to the feeding rollers 20, 21.

As previously stated, when the carriage 47 is moved in its rearward and non-feeding direction, the weight of the sheet friction device is insufficient, in itself, to materially displace the sheet, but the light weight of the friction is sufficient to cause the engaging sheet to be positively positioned against the rear abutment stop without buckling the sheet.

It is to be noted that when the sheet friction device bracket 63 and shoe 68 are operatively engaged, the bracket 63 having the pivot points 50, 66 is angularly disposed relative to the face plane of the stack and the lower pivot point 66 is disposed in advance of the carriage rod or bracket pivot 50. The friction inserts 69, in direct contact with the uppermost sheet of the stack, cause the bracket and pivots to form a knee action between the bracket 63 and shoe 68 as the carriage is moved in its forward or feeding direction. I have found that an effective knee action may be obtained by disposing the bracket 63 at various angles to the face plane of the stack and will be effective at an angle A where the advance pivot 66 is disposed below the horizontal plane of the carriage rod 50 substantially as illustrated at Fig. 6 with a full stack of sheets. The bracket assumes a range of angles as the stack is diminished and to an angle B as indicated substantially at Fig. 7 when the stack is practically depleted but, to function in the desired effective manner, the lower pivot 66 remains in advance of the vertical plane of the carriage rod and bracket pivot 50. The angle A must be sufficient so that when the carriage 47 is urged forward, the slight frictional resistance effected by the inserts 69 will cause the knee action to become operative and exert a limited, although sufficient pressure to advance the single uppermost sheet of the stack against the abutment stop 45.

As illustrated at Figs. 1, 11, 12 and 13, the abutment stop 45 is disposed so that only an advancing corner end of the sheet engages with the shank 45, see Figs. 11, 14, and, as the sheet is advanced, its corner 34a is buckled underneath the shank head 45a, Figs. 12, 15. As the sheet continues to advance, the springing action of the sheet material causes the sheet to release itself from the abutment, Figs. 13, 16, and be advanced from the stack to register with subsequent engaging means, such as the feeding rollers 20, 21 of the machine or other instrumentalities for further operating upon the sheet.

When the carriage 47 is moved in its forward feeding direction on each uppermost sheet of the stack, the lightweight construction and knee action will be effective to exert only sufficient pressure on the uppermost sheet with which it is engaged to advance its engaging sheet against the abutment stop where the buckling of the sheet corner will positively separate it from the stack and without a requirement for side friction or like devices being applied to retain the sheets in a stack formation. This front abutment stop further assures that the uppermost sheet will be advanced from the stack in a timed relation to permit of its registering for engagement with subsequent operating elements.

While the present illustration discloses the application of a single sheet friction unit and abutment stop, and which are effective with sheets of a reasonable width, it is apparent that a plurality of friction units may be associate with the carriage for sheets of a greater width or as occasion requires and further, a second abutment stop 45 may be disposed to engage with the opposite corner of the advancing sheet.

*Modified forms*

From the foregoing description of elements and their adaptation to function in accordance with the herein employed principle, it is immediately apparent that many modifications may be made in the specific elements themselves and their functions adapted to be embodied with various structures within the scope of the present invention.

For example, referring to Figs. 23, 24 and 25, I have illustrated a modified form of abutment stop for the forward end of the stack that is particularly adapted to quickly release the forward corner end of the sheet when the sheet is advanced and the corner thereof buckled against the stop shank 70. This shank 70 is provided with a head portion 70a and designed so as to be used at either the right or left hand forward corner of the sheet. The shank 70 may be slidably disposed in the bearing 46, attached to the stack support 35, and function in the manner of the previously described abutment stop shank 45. The head 70a is provided with a straight face 70b that is adapted to engage with the stack support flange 35a and thus prevent the shank 70 from rotating in its bearing 46. The portion 70c of the head is under-cut so as to facilitate in the buckling of the sheet as it is advanced from contact with the face of the shank 70, see Figs. 17 and 20. The extending portion 70d of the head is provided with an inclined face 70e contingent with the under-cut of the portion 70c and guides the buckled end upwardly as the sheet is advanced, see Figs. 18, 21, and thus, as the sheet is buckled and advanced, the buckled forward corner is quickly released to be further advanced, see Figs. 19 and 22.

Figs. 26 to 28 illustrate still another modified form of a front abutment stop and in these figures, the shank 71 is provided with an enlarged head 71a having a straight face 71b that is adapted to coact with the stack support flange 35a in a manner to prevent rotation of the shank 71 in a suitable bearing, such as is indicated by the reference character 46. The head 71a is under-cut at 71c in such a manner that only a very limited portion of the under face of the head engages with the face of the stack when the abutment stop is in operative position, and the angular face 71d of the head assists the buckled end of the corner sheet in freeing itself as the sheet is advanced.

I have also found that, with my lightweight frictional sheet contact, the stack may be pressed against the stack support side flange 35a and an adjustable friction member 72 closely engaged with the opposed side edge of the stack, see Figs. 29 and 30. When the opposed side edges of the stack are frictionally engaged, an abutment stop for the forward end of the stack may be dispensed with and the rear abutment stop 42 utilized to position the sheet for advancement from the stack so as to properly register for engagement, as previously mentioned. Due to the light-weight construction of the friction device, and the function of the knee action employed with the friction device, single sheets may be advanced from the stack for subsequent engagement with other feeding or advancing elements of the machine and without materially displacing the next uppermost sheets of the stack.

A further adaptation of the sheet feeding friction device is illustrated at Fig. 31 wherein the stack support 73 is provided with suitable connecting rods 74 that may be attached to suitable mechanism that intermittently elevates the stack so that the uppermost sheet of the stack 34g is substantially maintained in a determinate horizontal plane and relative to a fixed front abutment stop 75 disposed to be engaged by the forward end of the uppermost sheet of the stack as the sheet is advanced. With this arrangement, the sheet friction device knee action can remain disposed in its most desired and effective angle and the stack elevated so that its uppermost sheet engages with the friction device as the stack is diminished. The uppermost advancing sheet is buckled against the stop 75 which is preferably formed with an angularly disposed serrated face 75a with the serratures 75b having an arcuate contour. As the buckled end of the sheet is released, it is advanced against the deflecting plate 38 as previously described, and operatively positioned to be further advanced by feeding elements of the machine such, for example, as the feeding rollers 20, 21.

At Fig. 34 I have illustrated one of the varied machines to which the present sheet feeding device may be adapted. In this machine, which also represents a wet process duplicating machine, opposed side frames 80 support the operating elements of the machine. These side frames, only one of which is shown, are retained in a spaced-apart relation by suitable tie rods 81, 82, 83. The printing platen or drum 84 is mounted between the side frames and is adapted for rotation by any suitable means (not shown).

The printing platen 84 is provided with a suitable clamping device 85 for holding one end of a reverse master copy sheet clamped in the groove 86.

The sheet to be duplicated upon is fed from the tray 35 into contact with the feed rollers 88, 89 and advanced to the printing platen 84 and its coacting pressure roller 84a. These feed rollers 88, 89 are rotatably mounted in the side frames and are adapted to engage with one another with a degree of pressure.

Secured to or rotated by the printing platen 84 is a gear 90 which meshes with and rotates an intermediate gear 91 which, in turn, meshes with a pinion 92 associated with the roller 88, which, in this instance, is a combined feed and moisture applicator roller that receives moisture from a wick 93 having one edge in engagement with the peripheral face of the applicator roller 88 and its lower body portion in engagement with fluid contained in a suitable receptacle 94. As the printing platen 84 is rotated, the gearing connections cause the feed rollers 88, 89 to be continuously rotated in unison therewith.

The sheet feeding device, associated with this machine having elements adapted to be continuously rotated, is substantially the same as has been previously described, with the exception of the carriage bearing 48 and its roller 51 which are transposed and the friction device and front abutment stop are disposed at the opposite side of the stack support.

In this instance, the carriage is reciprocated in a timed relation to the feeding rollers 88, 89 and drum 84 by means of a pinion 97 associated and rotated in unison with the driven feed roller 88. This pinion 97 meshes with a gear 98 rotatably supported on a suitable stud 99 secured to the side frame of the machine. A crank arm 100 is also rotatably mounted on the gear stud 99 and is adjustably secured to the side face of the gear 98 by means of a suitable lock screw 101. The carriage lever 52 has one of its ends pivotally connected at 102 to the outer end of the arm 100 and, as the gear 98 is rotated, this arm 100 functions to impart a crank motion which, through the connecting lever 52, reciprocates the feeding carriage along the face of the stack.

From the foregoing illustrations, it is apparent that many modifications and adaptations may be effected with the present disclosure by those skilled in the art without departing from the spirit and scope of the invention, therefore, I do not wish to be limited to the specific details and arrangements of parts herein disclosed.

What I claim is:

1. In a sheet feeding device, a support for a stack of sheets, upwardly extending guides for the opposed edges of the stack, one of said guides being transversely adjustable on said support and embodying a base extending longitudinally of said support, a pivoted stop member supported by said guide; an abutment stop for the forward end of the stack of sheets comprising a shank portion vertically disposed and slidably mounted in said support and having a projecting portion adapted to engage with the upper face of the stack, said abutment stop being positioned from the center of said forward end and toward one of the side edges of the stack; a carriage movable longitudinally relative to said stack support, said carriage including a slidable bearing portion engaging with a guide member associated with said support and an opposed bearing member for said carriage freely engaging with said support; a transverse member for said carriage; a member freely supported by said transverse member; a friction device attached to said last member and adapted to engage with a portion of the upper face plane of the stack of sheets, and substantially in advance of said carriage transverse member; means for reciprocating said carriage relative to the face plane of the stack of sheets and in a timed relation, and whereby the uppermost sheet of the stack is separated and advanced from said stack.

2. A sheet feeding device embodying a support for a stack of sheets; upwardly extending guides for the opposed side edges of the stack, one of said guides being transversely adjustable on said support, said adjustable guide including a base extending longitudinally of said support; a pivoted arm extending inwardly from said guide and provided with a stop adapted to be engaged with a portion of the rear end of the stack; an adjustable abutment stop for the forward end of the stack of sheets, said stop being disposed from the center of the forward end toward one of the side edges of the stack and adapted to engage a limited area of the forward end of the uppermost sheet of the stack; a carriage movable longitudinally relative to said stack support with means for reciprocating said carriage in a timed relation; a rockable member supported by said carriage and movable therewith, said rockable member having a friction device associated therewith for operative engagement with the uppermost sheet of the stack when said carriage is moved in one direction to advance a single sheet from the stack, and inoperative to act on said stack when said carriage is moved in its opposite direction.

3. A sheet feeding device having a support for a stack of sheets, stack guide means engaging with the opposed sides of the stack in a substantially free relationship; an abutment stop for the forward end of the stack of sheets comprising a shank portion vertically disposed and slidably mounted relative to said forward end of the stack, adjusting means for said abutment stop including a projecting portion integral with said shank and adapted to engage with the upper face of the stack; a reciprocal carriage disposed above said stack and support with means for reciprocating said carriage in a timed relation; means carried by said carriage for engaging with the uppermost sheet of the stack when said carriage is moved in one of its directions and whereby said uppermost sheet is singly disengaged from said abutment stop and advanced relative to said stack.

4. A sheet feeding device having a support for a stack of sheets; an abutment stop for the forward end of the stack of sheets that includes a vertically adjustable member normally disposed in a slightly spaced relation to said forward end, said member having a projecting portion in engagement with the uppermost sheet of the stack and by means of which said member is vertically retained in an adjusted relation relative to the height of the stack, a carriage disposed above said support and stack with means for reciprocating said carriage relative to said support and stack and in a timed relation; means carried by said carriage and adapted for operative engagement with the uppermost sheet of the stack when said carriage is moved in one of its directions whereby said uppermost sheet is advanced against said abutment stop and singly disengaged from said stack as said sheet is advanced.

5. A sheet feeding device that embodies a support for a stack of sheets and a gravity actuated abutment stop for the forward end of the stack comprising a shank portion slidably disposed in a spaced relation to said forward end, said shank having an extension adapted to engage with the uppermost of the stack with a minimum degree of pressure and whereby said abutment stop is retained in an adjusted relation to the height of the stack.

6. A sheet feeding device that embodies a support for a stack of sheets and an abutment stop for the forward end of the stack comprising a shank portion vertically disposed and freely slidably mounted relative to said forward stack end, said shank having a projecting portion adapted to engage with an upper face portion of said stack with a minimum degree of pressure and whereby said stop is maintained in an adjusted relation to the height of said stack.

7. A device of the character specified including a stop for sheets being advanced from a stack of sheets comprising a shank portion slidably mounted and disposed adjacent one of the forward end corners of the stack and having a head portion adapted to engage with an area of the uppermost of the stack with means adapted to prevent rotary movement of said shank and head; faces formed in said head portion and adapted to relieve the adjacent corner portion of the uppermost sheet of the stack as said sheet is advanced and forced against said stop.

8. A device of the character specified including a stop for sheets being advanced from a stack of sheets comprising a shank portion slidably mounted and disposed adjacent one of the forward end corners of the stack and having a head portion adapted for engagement with an area of the uppermost of the stack, said head having a portion associated therewith that extends below the face plane of the stack.

9. A device of the character specified including a stop for sheets being advanced from a stack of sheets comprising a shank portion slidably mounted and disposed adjacent one of the forward end corners of the stack and having a head portion adapted to engage with an area of the uppermost of the stack with means adapted to prevent rotary movement of said shank and head portion; inclined faces formed in said head portion and adapted to relieve the adjacent corner portion of the uppermost sheet of the stack as said sheet is advanced and forced against said stop, said head having a portion associated therewith that extends below the face plane of the stack.

10. A sheet feeding device that embodies a support for a stack of sheets and an abutment stop for the forward end of the stack comprising a member having an angularly disposed serrated face, said serratures having an arcuate contour adapted to be engaged by the uppermost sheet of the stack as said sheet is advanced from the stack with means for advancing said sheet in a timed relation, together with means for maintaining a relative relation between said stop and the forward end of the stack as the height of the stack is diminished.

11. A sheet feeding device that embodies a support for a stack of sheets and an abutment stop for the forward end of the stack comprising a member having an angularly disposed face with serratures associated therewith that are adapted to be engaged by the uppermost sheet of the stack as said sheet is advanced from the stack with means for advancing said sheet in a timed relation, together with means for maintaining a relative relation between said stop and the forward end of the stack as the height of the stack is diminished.

12. In a sheet feeding device, a support for a stack of sheets; abutment stops for the opposed ends of the stack; a carriage disposed relative to the face plane of the stack with means for guiding said carriage relative to said face plane; means for reciprocating said carriage in a timed relation; a pivotal element supported by said carriage and, when in operative position, being disposed at an angle to the face plane of the stack and substantially in advance of its pivotal connection with said carriage; a friction member associated with said pivotal element and adapted to engage with the uppermost sheet of the stack with so slight a degree of pressure as to be normally ineffective to displace said uppermost sheet from said stack when said carriage is moved in one direction and effective, through means of said pivotal element and the friction of said member, to advance said uppermost sheet singly from said stack when said carriage is moved in its opposite direction.

13. In a sheet feeding device, a support for a stack of sheets; abutment stops for the opposed ends of the stack; a carriage disposed relative to the face plane of the stack with means for guiding said carriage relative to said face plane; means for reciprocating said carriage in a timed relation; a pivotal element supported by said carriage and transversely adjustable relative to the face plane of the stack, said pivotal element, when in operative position, being disposed at an angle to the face plane of the stack and substantially in advance of its pivotal connection with said carriage; a friction member associated with said pivotal element and adapted to engage with the uppermost sheet of the stack with so slight a degree of pressure as to be normally ineffective to substantially displace said uppermost sheet relative to the stack when said carriage is moved in one direction and effective, through means of said pivotal element and the friction of said member, to advance said uppermost sheet singly from said stack when said carriage is moved in its opposite direction.

14. In a sheet feeding device, a support for a stack of sheets; abutment stops for the opposed ends of the stack; a carriage disposed relative to the face plane of the stack with means for guiding said carriage relative to said face plane; means for reciprocating said carriage in a timed relation; an element rockably supported by said carriage and, when in operative position, being disposed at an angle to the face plane of the stack and substantially in advance of its pivotal connection with said carriage; a member pivotally connected to said element and disposed in a substantially parallel relation to the face plane of the stack; friction elements carried by said member and in engagement with the uppermost sheet of the stack with so slight a degree of pressure as to be normally ineffective to displace said uppermost sheet when said carriage is moved in one direction and effective, through means of said angularly positioned rockable element and said friction elements, to advance said uppermost sheet singly from said stack when said carriage is moved in its opposite direction.

15. A device of the character specified having means for advancing a sheet singly from a stack of sheets, said means including a friction device in engagement with the uppermost sheet of the stack and elements associated with said device to form a knee action adapted to operatively exert a degree of pressure on said friction device and whereby said uppermost sheet is singly advanced from the stack when said device is moved in one direction, said knee action being inoperative to exert pressure on the friction device when said device is moved in its opposite direction.

16. A device of the character specified having means for advancing a sheet singly from a stack of sheets, said means including a shoe having a minimum of weight and disposed substantially parallel to the face plane of the stack, friction elements associated with said shoe and in engagement with the uppermost face of the stack, a member pivotally connected to said shoe in a manner whereby said shoe and member form a knee action adapted to exert a degree of pressure on said friction elements and whereby said uppermost sheet is singly advanced from the stack when said device is moved in one direction, and said knee action being inoperative when said device is moved in its opposite direction.

17. In a device of the character specified, a support for a stack of sheets with means associated with said support and adapted to retain said sheets in a stack formation, in combination with a reciprocal carriage disposed relative to the face of the stack with means for reciprocating said carriage in a timed relation, a pivotal element supported by and actuated with said carriage and, when in operative position, being disposed at an angle to the face plane of the stack and substantially in advance of its pivotal connection with said carriage, a friction member associated with said pivotal element and adapted to engage with the outermost sheet of the stack with so slight a degree of pressure as to be normally ineffective to displace said outermost sheet from said stack when said carriage is moved in one direction and effective, through means of said pivotal element and the friction of said member, to advance said outermost sheet singly from said stack when said carriage is moved in its opposite direction.

18. A device of the character specified having a support for a stack of sheets and means exerting a degree of pressure on the opposed sides of the stack in a manner to retard movement of sheets of the stack, in combination with a reciprocal carriage disposed relative to the face of the stack with means for reciprocating said carriage in a timed relation, a pivotal element carriage in a timed relation, a pivotal element supported by and actuated with said carriage and, when in operative position, being disposed at an angle to the face plane of the stack and substantially in advance of its pivotal connection with said carriage, a friction member associated with said pivotal element and adapted to engage with the outermost sheet of the stack with so slight a degree of pressure as to be normally ineffective to displace said outermost sheet from said stack when said carriage is moved in one direction and effective, through means of said pivotal element and the friction of said member, to advance said outermost sheet from the stack when said carriage is moved in its opposite direction.

19. A device of the character specified having a support for a stack of sheets and means for advancing a sheet singly from the stack that includes pivotal connections, a member associated with said connections and adapted to be disposed in a substantially parallel relation to the face plane of the stack, detachable friction elements carried by said member and disposed in a spaced relation to one another and adapted, when in operative position, to engage with the outermost of the stack.

20. A device of the character specified having a support for a stack of sheets and means for advancing a sheet singly from the stack that includes pivotal connections, a rockable member associated with said connections and adapted to be disposed in a substantially parallel relation to the face plane of the stack, friction inserts associated with said member and disposed in a spaced relation to one another and adapted, when said member is in operative position, to be engaged with the outermost of the stack with a degree of pressure.

21. In a device of the character specified, friction means adapted to continuously engage with the outermost of a stack of sheets, a link connection to said first means and forming sole pressure means associated with said first means that is operative when said means are moved in one direction and inoperative when said means are moved in an opposed direction.

22. In a device of the character specified, friction means normally in continued engagement with the outermost of a stack of sheets, pivotal connections for said friction means and forming sole pressure means associated with said first means that is operative when said means are moved in one direction and inoperative when said means are moved in an opposed direction.

23. The method of advancing sheets singly from a stack of sheets that comprises applying a limited friction pressure to the uppermost of the stack that is sufficient to move the uppermost sheet of the stack to a predetermined position and without materially buckling the sheet in a nonfeeding direction and increasing the pressure to move the engaging sheet singly from the stack in its feeding direction.

24. The method of advancing sheets singly from a stack of sheets that comprises the continuous application of friction to the uppermost sheet of the stack and the application of pressure to said friction, said application being sufficient to move said sheet to a determinate position in a non-feeding direction without materially displacing the engaging sheet from its normal position relative to the stack and increasing the application of friction in a feeding direction sufficient to advance the engaging sheet singly from the stack.

25. A method of feeding sheets from a stack which consists in drawing by frictional contact the top sheet back to a predetermined starting position and without materially buckling the sheet and then feeding the sheet forward by frictional contact a predetermined distance.

26. A method of feeding sheets from a stack which consists in drawing by frictional contact the top sheet back to a predetermined starting position without materially buckling the sheet and then feeding the sheet forward by increased frictional contact a predetermined distance.

27. In a paper feeder, a freely rockable reciprocating friction element movable over the stack in contact with the top sheet and exerting friction on the top sheet during movement in both directions, a back stop, and a pivotal link connecting means to cause the friction element to exert greater pressure against the paper on the feeding stroke than on the return stroke.

28. In a paper feeder, a friction element and operating mechanism therefor to reciprocate the friction element such that on the back stroke the element exerts only sufficient friction to drag the sheet with it, but not to buckle it when it encounters any stop, while on the feeding stroke the friction element exerts sufficient force to buckle the sheet when a stop is encountered.

29. A paper feeder comprising a freely rockable friction element reciprocable over a stack of paper in continuous contact with the top sheet and means for reciprocating said element, said means including a pivoted connecting link having provision for exerting a different pressure when the friction element is moving in one direction than in the other.

30. A paper feeder comprising a freely rockable friction element reciprocable over a stack of paper in contact with the top sheet, a back stop and means for reciprocating said element toward and from said back stop, said reciprocating means including a pivoted connecting link having provision for exerting a greater frictional pressure when said element is moving away from the back stop than when it is moving toward it.

31. A paper feeder comprising a friction element reciprocable over a stack of paper in contact with the top sheet, means for reciprocating said element, said means including a connection that, in association with said element, solely causes said element to exert a downward component only when moving in the forward feeding direction.

32. A paper feeder comprising a friction element resting on and reciprocable over a stack of paper in contact with the top sheet, means for reciprocating said element, said means including a pivoted connecting link that, in association with said element, solely causes said element to exert a downward component only when moving in the forward feeding direction.

33. A paper feeder comprising a freely rockable friction element reciprocable over a stack of paper in contact with the top sheet, means for reciprocating said element, said means including a pivoted link connection for causing said element to exert a downward component on said friction member only when moving in the forward feeding direction, said friction element being adapted to engage the uppermost sheet of the stack with so slight a pressure as to be normally ineffective to materially displace and buckle said uppermost sheet relative to the stack when moving in one direction and encountering an abutment stop and effective to advance said uppermost sheet singly from said stack when moving in the opposite direction.

34. In combination with a continuously rotating cylinder to which sheets are to be fed, a sheet stack, a freely rockable friction element reciprocable over a stack of paper in contact with the top sheet, a back stop and means for reciprocating said friction element, said means including a pivoted connection having provision for exerting a different pressure when moving toward the back stop than when moving toward the cylinder, and connections for operating said reciprocating element in time with the rotation of the cylinder.

35. In a paper feeder, a front stop for the forward end and in a spaced relation thereto, a sheet stack, said front stop having an overhanging head engaging with a limited area of the uppermost marginal face of the top sheet, said stop and head being of such weight that it will engage with a minimum degree of pressure, and be held in engagement therewith by its own weight only.

36. In a paper feeder, sole means for advancing a sheet singly from a stack of sheets that includes a reciprocating friction element movable over the stack in contact with the top sheet and exerting friction on the top sheet during movement in both directions, a back stop, and means to cause the friction element to exert greater pressure against said top sheet on the feeding stroke than on the return stroke.

37. A paper feeder having sole means for advancing a sheet singly from a stack of sheets that includes a freely rockable friction element movable over the stack in contact with the top sheet and exerting friction on the top sheet during movement in both directions, and means to cause the friction element to exert greater pressure against said top sheet on the feeding stroke than on the return stroke.

38. In a paper feeder, sole means for advancing a sheet singly from a stack of sheets that comprises a friction element reciprocable over a stack of paper and in continuous contact with the top sheet and means for reciprocating said element, said means having provision for exerting a different pressure when the friction element is moving in one direction than in the other.

39. In a paper feeder, sole means for advancing a sheet singly from a stack of sheets that comprises a freely rockable friction element reciprocable over a stack of paper and in continuous contact with the top sheet and means for reciprocating said element, said means having provision for exerting different a pressure when the friction element is moving in one direction than in the other.

40. In a paper feeder, sole means for advancing a sheet singly from a stack of sheets that comprises a friction element reciprocable over a stack of paper in contact with the top sheet thereof, a back stop, and means for reciprocating said element toward and from said back stop, said reciprocating means having provision for exerting a greater frictional pressure when said element is moving away from the back stop than when it is moving toward it.

41. In a paper feeder, sole means for advancing a sheet singly from a stack of sheets that comprises a freely rockable friction element reciprocable over a stack of paper and in contact with the top sheet thereof, a back stop, and means for reciprocating said element toward and from said back stop, said reciprocating means having provision for exerting a greater frictional pressure when said element is moving away from the back stop than when it is moving toward it.

FREDERICK W. STORCK.